United States Patent Office 2,795,593
Patented June 11, 1957

2,795,593

PROCESS FOR PREPARING ALKALI METAL SALTS OF 1,4-DIAMINO-2,3-ANTHRAQUINONE-DISULFONIC ACID

Dexter B. Pattison, Wilmington, Del., assignor to E. I. du Pont de Nemours and Company, Wilmington, Del., a corporation of Delaware No Drawing. Application July 22, 1953,
Serial No. 369,713

6 Claims. (Cl. 260—371)

This invention relates to an improved process for the manufacture of the sodium salt of 1,4-diamino-2,3-anthraquinone-disulfonic acid from 1,4-diamino-2,3-dichloroanthraquinone.

The product of the present invention is a dye intermediate and is also useful for dyeing synthetic fibers such as those derived from acrylonitrile.

Baumann U. S. Patent No. 1,975,386 discloses a process for the preparation of the product of the present invention by condensing 1,4-diamino-2,3-dichloroanthraquinone with boric acid and sulfuric acid at 60° C. to form a boric acid ester complex. The excess acid is neutralized, and sodium sulfite added, which replaces the chlorine atoms with the sulfonic group when heated at about 95° to 100° C. The reaction may be indicated as follows:

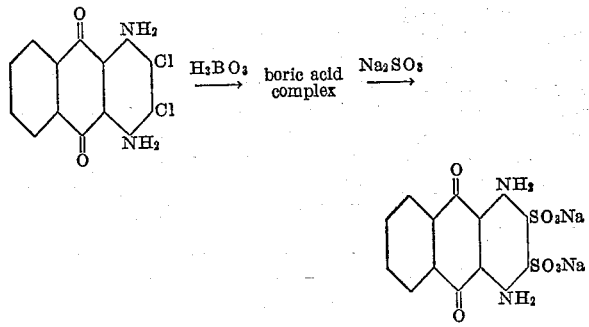

Although this general process may be carried out by U. S. P. 1,975,386 to Baumann, in particular Example 1, it has been found practically impossible to duplicate Examples 2 and 3 of this patent. The yield obtained in Example 1 of Baumann is comparatively low to that achieved by the present process. In Example 1 of Baumann, acetic anhydride is employed as solvent; the present invention avoids the use of this objectionable solvent.

It has now been found that by observing certain critical precautions in the above-described process, the yield can be increased to 80% to 90% of the theoretical, and such yields can be consistently duplicated with little difficulty.

It is an object of this invention, therefore, to provide a method by which the objectionable solvents of the prior art in the above reaction may be eliminated. Another object is the provision of a method which increases the yield from an average of about 50% to about 85% or higher. A still further object is the provision of a method of carrying out the above reaction more economically, and under such conditions that high yields may be readily obtained. Other objects will appear as the description of the invention proceeds.

These objects are accomplished by heating 1,4-diamino-2,3-dichloroanthraquinone with sulfuric acid in the presence of boric acid, precipitating the boric acid complex of the anthraquinone compound obtained in water, and then converting the complex to the desired disulfonate by heating the said complex with an alkali metal sulfite at a temperature of 80° to 100° C. as more fully described hereinafter.

The present invention departs from the prior art, particularly in the step of converting the boric acid complex to the disulfonate. This is accomplished by drowning the boric acid complex below 20° C. in the presence of a buffer. The term "buffer" is intended to include all salts of strong bases and weak acids which act to neutralize the sulfuric acid and includes the alkali metal phosphates, carbonates, borates, and mixtures thereof. The pH is then adjusted with an alkali such as an alkali metal hydroxide or salt of a weak acid to a value of at least 9.0 and preferably 9.9 to 10.8 at 25° C., after which the mass is heated with the alkali metal sulfite at 80° to 100° C. The adjustment of the pH to 9.9 to 10.8 may be done by the addition of hydroxide or one of the more alkaline buffers defined above. One of the preferred methods is the use of $Na_2CO_3$ to neutralize the $H_2SO_4$ and bring the pH to 9.9 to 10.8 at 25° C. The resulting solution of the 1,4-diamino-2,3-anthraquinone-disulfonate has a pH of 7.4 to 9.1.

The sulfuric acid used preferably has a concentration of 90% to 95% $H_2SO_4$ in the first step of the reaction. Any alkali metal sulfite, hydroxide or carbonate may be employed in the process, but sodium is preferred because of its low cost and ready availability.

Conditions of temperature and pH at the time of drowning and during the early stages of the heating in the presence of sodium sulfite are particularly critical. Evidence at hand tends to show that any decomposition of the boric acid complex prior to replacement of the chlorine atoms by the sulfonate groups defeats the latter reaction. In other words, the transformation involved must take place in the following order:

(a) Boric acid complex formation on the dichloro compound
(b) Replacement of chlorines by sulfonate groups
(c) Decomposition of the boric acid complex to yield the disulfonate compound It has also been found that the boric acid complex of the 1,4-diamino-2,3-dichloroanthraquinone decomposes in dilute aqueous suspension at a notable rate when the slurry is acidic, and very rapidly when it is strongly alkaline. Decomposition, however, is least under neutral or mildly alkaline conditions. If an alkali metal sulfite is added to the boric acid complex, there is substantially no decomposition at room temperature on standing overnight at any practical pH, i. e. from 2.5 to 11.

The following examples are given by way of illustration, but no limitation is intended to be placed thereon, since the amount and kind of buffer may vary considerably, provided the conditions of temperature and pH are adhered to as described above.

Example 1

166 parts of powdered boric acid were stirred into 1150 parts of 90% sulfuric acid at 60° to 70° C. After the addition of 381 parts of powdered 1,4-diamino-2,3-dichloroanthraquinone the mixture was stirred four hours at 60° C. The reaction mass containing the boric acid complex of the amine was then poured into 4000 parts of water containing 376 parts of $Na_2HPO_4.7H_2O$ and enough ice (about 6000 parts) to keep the temperature below 10° C. 30% sodium hydroxide solution (about 2650 parts) was added rapidly, below 10° C., until the pH was 7–10, after which the temperature was raised to 20° to 30° C., and the pH was adjusted to 9.9 by addition of more sodium hydroxide. Then 530 parts of anhydrous sodium sulfite were added, and the color changed from blue to green. The mixture was heated to 98° C. and the color became deep blue. The solution was then heated at 98° to 102° C. for one hour, after which it was filtered hot to remove insoluble impurities. The filtrate had a pH of 7.4 and contained the sodium salt of 1,4-diamino-2,3-anthraquinone-disulfonic acid in excellent yield as shown by conversion to the 1,4-diamino-2,3-anthraquinone-dicarbonitrile.

The disulfonic acid was converted directly into the dicarbonitrile in high yield by essentially the method of U. S. Patent No. 1,938,029 (1933) as follows:

To the above solution, adjusted to a pH of 10.0 to 10.5 by addition of sodium hydroxide, was added 302 parts of sodium cyanide. After heating the reaction mixture for 6 hours at 75° C., the dicarbonitrile was filtered, washed with hot water and dried.

In this example, the sodium salt of 1,4-diamino-2,3-anthraquinone-disulfonic acid may be isolated from its hot solution by adding thereto 10 parts of anhydrous sodium sulfate for every 100 parts by volume of solution. The salted filtrate is then cooled to 20° to 25° C., filtered and the disulfonate is washed with 10% sodium sulfate solution. The product thus produced contains sodium sulfate and, after drying, analyzes 5.57% inorganic sulfur, 10.04% organic sulfur (theory is 10.9%) and 4.88% nitrogen (theory is 4.76%). An excellent yield is obtained.

*Example II*

Example I was repeated except that the boric acid complex was formed in 98% sulfuric acid and the drowned slurry of this complex was treated with the sodium hydroxide solution at 0° to 10° C. until a pH of 10.8 was obtained. The filtrate containing the 1,4-diamino-2,3-anthraquinone-disulfonic acid sodium salt had a pH of 9.1. A good yield of the disulfonic acid was obtained as evidenced by its conversion to the corresponding dicarbonitrile by following the process of the preceding example.

*Example III*

This experiment illustrates the effect of a pH below 7.4 on the reaction medium after the hot sulfite treatment, and the effect of temperature together with the pH prior to sulfiting.

In an example similar to the first, the drowned boric acid complex was treated with sodium hydroxide until a pH of 10.3 at 0° to 5° C. was obtained. After adding sodium sulfite and heating to 100° C., the pH was 7.1 and the color was brown. Trisodium phosphate was added until the pH was 7.8, whereupon the color slowly changed from brown to blue, indicating that a pH of 7.1 is below the operable range for the desired reaction. After completing the experiment as described in Example I, an excellent yield of the desired disulfo compound was obtained.

*Example IV*

This example illustrates the use of carbonate and sulfite in the drowning solution. Both compounds act as buffers, but carbonate is employed mainly to neutralize the sulfuric acid and sulfite to increase the stability of the boric acid complex of 1,4-diamino-2,3-dichloroanthraquinone.

78 parts of boric acid were stirred in 626 parts of 90% sulfuric acid at 60° to 70° C. After addition of 176 parts of powdered 1,4-diamino-2,3-dichloroanthraquinone the mixture was stirred 4 hours at 60° C. The reaction mass containing the boric acid complex of the amine was added gradually over 5 hours at 8° to 15° C. to a solution of 40 parts trisodium phosphate $(Na_3PO_4.12H_2O)$ 228 parts sodium bisulfite and 714 parts of sodium carbonate dissolved in 3200 parts of water. The pH at the end of drowning was 7.0, but other experiments have indicated that by decreasing the amount of carbonate, the pH can be made as low as 2.5 without affecting the yield, when sufficient sulfite is present in the solution. The pH was adjusted to 9.9 by the addition of sodium hydroxide solution. The mixture was heated to 80° to 85° C. until formation of the desired compound was complete, as shown by a spot test:

A drop of the solution is spotted on filter paper. Initially the color is green with a yellow bleed. As the reaction progresses the color changes from green to blue and the yellow bleed disappears; at this point the formation of the alkali metal salt of 1,4-diamino-2,3-anthraquinonedisulfonic acid is complete. Other tests indicate that complete reaction can be obtained at lower temperatures—either by 3 days at 25° to 30° C. or 2 hours at 60° C. if the initial pH is 9.8 or higher.

After cooling to 40° to 45° C. and filtering, an excellent yield of the sodium salt of 1,4-diamino-2,3-anthraquinonedisulfonic acid was obtained. If desired, the small amount of insoluble impurities can be removed by dissolving in water, filtering hot, salting out, and cooling as described in Example I.

*Example V*

If the method of Example IV is followed, but with trisodium phosphate completely omitted from the drowning solution and with the amount of sodium carbonate increased by 20%, i. e. about 856 parts, an excellent yield of the sodium salt of 1,4-diamino-2,3-anthraquinonedisulfonic acid is obtained.

Trisodium and disodium phosphates are among the preferred buffers, but other alkali metal salts of phosphoric acid and similar weak acids such as the carbonates may be used, provided they do not interfere with the main reaction and act as a buffer in the pH range from 8 to 11. The amount of buffer is not particularly critical and usually varies within the range of 1.0 to 2.5 mols per mol of 1,4-diamino-2,3-dichloroanthraquinone, depending on the particular buffer and the acidity of the reaction mixture. Enough alkali must be used to neutralize the acid and bring the pH of the mixture to 9.0 to 10.8. If the buffer is not sufficiently alkaline alone, hydroxide or a more alkaline salt should be used to supplement it.

In carrying out the initial boric acid condensation to form the boric acid complex, the reaction time and temperature are not particularly critical, and may depart somewhat from the values called for in the examples. It has been observed, however, that extended heating periods have a tendency to decrease the yield of the final product. Likewise, when the temperature during the boric acid condensation was increased to 80° C., the yield decreased, but when the temperature was increased to 100° C., decomposition occurred and the yield was substantially zero.

The amount of sulfuric acid used during this condensation may also be varied considerably without any adverse effect upon the yield, but when the acid is increased, a corresponding amount of sodium hydroxide or carbonate and ice must be present during neutralization. The acid concentration also may vary considerably.

As suggested above, the preferred method of converting the boric acid complex into the disulfonic acid is to add the boric acid complex dissolved in sulfuric acid to a mixture of ice, water, sodium sulfite, and sodium phosphate or carbonate, neutralizing with sodium hydroxide or carbonate until the required pH of 9.9 to 10.8 is obtained at the correct temperature. In some cases, this order may be changed, namely the boric acid complex dissolved in sulfuric acid can be added to a mixture of ice water and the theoretical amount of sodium hydroxide needed to neutralize the acid, disodium phosphate and sodium sulfite. Example V illustrates the use of sodium carbonate as the sole buffer and neutralizing agent.

The present invention represents an economical way of obtaining high yields of the alkali metal salts of 1,4- diamino-2,3-anthraquinonedisulfonic acid which may be used as an intermediate for dyes or as a dye for synthetic fibers. These sulfonates are particularly useful in dyeing "Orlon" acrylic fiber when applied from acidic baths in the presence of cuprous ion.

The invention produces unexpected results in that it has been known that the boric acid complex of the disulfonate compound decomposes at higher temperature in solutions which are nearly neutral, but it was surprising that the boric acid complex of the dichloro compound does not decompose in an alkaline system under the conditions of the invention thus affording an almost quantitative conversion of the dichloro compound to the disulfonate derivative at the elevated temperatures indicated.

It is apparent that many widely different embodiments of this invention can be made without departing from the spirit and scope thereof, and therefore it is not intended to be limited except as indicated in the appended claims.

This application is a continuation-in-part of my application Serial No. 287,260, now abandoned.

I claim:

1. In the process of manufacturing an alkali metal salt of 1,4-diamino-2,3-anthraquinone disulfonic acid from 1,4-diamino-2,3-dichloroanthraquinone in which the latter is heated with sulfuric and boric acids at 60° to 70° C. followed by precipitation of the resulting boric acid complex of the dichloro compound in water and then converting to the disulfonate by heating with an alkali metal sulfite, the improvement which consists in drowning the boric acid complex and neutralizing in an aqueous system containing at least one mol of a buffer taken from the group consisting of alkali metal phosphates, carbonates, borates and mixtures thereof per mol of anthraquinone compound at a temperature below 20° C. and adjusting the pH of the mixture until a test at 25° C. establishes a pH within the range of 9.0 to 10.8, followed by heating said mixture, at a temperature within the range of 80° C. to 100° C., with an alkali metal sulfite to obtain the alkali metal salt of 1,4-diamino-2,3-anthraquinone disulfonic acid.

2. The process of claim 1 in which the buffer is an alkali metal phosphate.

3. The process of claim 1 in which the buffer is an alkali metal borate.

4. In the process of manufacturing an alkali metal salt of 1,4-diamino-2,3-anthraquinone disulfonic acid from 1,4-diamino-2,3-dichloroanthraquinone in which the latter is heated with sulfuric and boric acids at 60° to 70° C. followed by precipitation of the resulting boric acid complex of the dichloro compound in water and then converting to the disulfonate by heating with an alkali metal sulfite, the improvement which consists in drowning the boric acid complex and neutralizing in an aqueous system containing an alkali metal sulfite and at least one mol of a buffer taken from the group consisting of alkali metal phosphates, carbonates, borates and mixtures thereof per mol of anthraquinone compound at a temperature below 20° C. and adjusting the pH of the mixture until a test of 25° C. shows a pH of 9.0 and 10.8, followed by heating said mixture, at a temperature within the range of 80° C. to 100° C., to obtain the alkali metal salt of 1,4-diamino-2,3-anthraquinone disulfonic acid.

5. The process of claim 4 in which the resultant solution of alkali metal salt of 1,4-diamino-2,3-anthraquinone disulfonic acid has a pH between 7.4 and 9.1.

6. The process of preparing the sodium salt of 1,4-diamino-2,3-anthraquinone disulfonic acid which comprises stirring about 78 parts of boric acid in 626 parts of 90% sulfuric acid at 60° to 70° C., adding about 176 parts of 1,4-diamino-2,3-dichloroanthraquinone to the mixture, stirring for about 4 hours at 60° C., pouring the reaction mass slowly into about 3200 parts of cold water containing about 856 parts of sodium carbonate and 228 parts sodium bisulfite, adjusting the pH of the mixture until a test at 25° C. establishes a pH within the range of 9.0 to 10.8, followed by heating said mixture to a temperature within the range of 80° to 85° C., cooling, and recovering the sodium salt of 1,4-diamino-2,3-anthraquinone disulfonic acid.

References Cited in the file of this patent
UNITED STATES PATENTS

| | | |
|---|---|---|
| 1,975,386 | Baumann | Oct. 2, 1934 |
| 2,008,056 | Baumann | July 16, 1935 |
| 2,025,370 | Baumann | Dec. 24, 1935 |